(12) United States Patent
Katrini et al.

(10) Patent No.: US 8,657,360 B2
(45) Date of Patent: Feb. 25, 2014

(54) ADJUSTING DEVICE FOR A ROOF CAP OF A COLLAPSIBLE ROOF

(75) Inventors: Waleri Katrini, Bietigheim-Bissingen (DE); Marcus Papendorf, Boennigheim (DE); Berthold Klein, Sachsenheim (DE); Randolf Liebhardt, Grafenau (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 272 days.

(21) Appl. No.: 13/333,298

(22) Filed: Dec. 21, 2011

(65) Prior Publication Data

US 2012/0161465 A1  Jun. 28, 2012

(30) Foreign Application Priority Data

Dec. 24, 2010 (DE) .......................... 10 2010 056 246

(51) Int. Cl.
*B60J 7/12* (2006.01)

(52) U.S. Cl.
USPC ..................... 296/121; 296/107.19

(58) Field of Classification Search
USPC ............. 296/107.01, 107.09, 107.11, 107.12, 296/107.13, 107.15, 107.16, 107.17, 296/107.18, 107.19, 107.2, 109, 114, 121, 296/128, 219, 224
See application file for complete search history.

(56) References Cited

U.S. PATENT DOCUMENTS

| | | | |
|---|---|---|---|
| 3,266,838 A * | 8/1966 | Heincelman ................... | 296/121 |
| 4,830,428 A | 5/1989 | Masuda et al. | |
| 5,018,783 A * | 5/1991 | Chamings et al. ............ | 296/219 |
| 5,746,475 A | 5/1998 | Caye et al. | |
| 5,944,375 A * | 8/1999 | Schenk et al. ................. | 296/108 |
| 6,267,433 B1 * | 7/2001 | Bayer et al. .................... | 296/121 |
| 6,305,734 B1 * | 10/2001 | Pecho et al. ............. | 296/107.01 |
| 6,817,658 B2 * | 11/2004 | Ohnishi et al. ................ | 296/213 |
| 6,827,392 B2 * | 12/2004 | Doncov et al. ................ | 296/147 |

(Continued)

FOREIGN PATENT DOCUMENTS

| | | | |
|---|---|---|---|
| DE | 3816977 A1 | 12/1988 | |
| DE | 3828062 A1 * | 3/1989 | ................. B60J 7/04 |

(Continued)

OTHER PUBLICATIONS

European Patent Office, European Search Report for the corresponding European Patent Application No. EP 11 00 9875 mailed Jun. 24, 2013.

*Primary Examiner* — Glenn Dayoan
*Assistant Examiner* — Paul Chenevert
(74) *Attorney, Agent, or Firm* — Brooks Kushman P.C.

(57) ABSTRACT

A collapsible roof for a vehicle includes a roof guide, a roof cap, a top fabric, and an adjusting mechanism. The adjusting mechanism movably couples the roof cap to the roof guide such that the roof cap with the top fabric are movable relative to the roof guide between a closed position in which the top fabric covers a roof opening and an opened position in which the top fabric exposes the roof opening. The adjusting mechanism includes front and rear control arms coupled to the roof cap. The front control arm includes a locking hook and the rear control arm includes a latching hook. The locking hook engages a front cavity of the roof guide in the closed position to fix the roof cap in place and the latching hook engages a rear cavity of the roof guide in the opened position to fix the roof cap in place.

20 Claims, 3 Drawing Sheets

(56) References Cited

U.S. PATENT DOCUMENTS

| | | | |
|---|---|---|---|
| 7,578,550 B2* | 8/2009 | Sawada et al. | 296/224 |
| 7,744,145 B2* | 6/2010 | Mooney et al. | 296/107.18 |
| 8,459,730 B2* | 6/2013 | Sawada et al. | 296/223 |
| 2007/0228779 A1* | 10/2007 | Stallfort | 296/224 |
| 2008/0277963 A1* | 11/2008 | Dietl | 296/107.09 |
| 2012/0126586 A1* | 5/2012 | Grimm et al. | 296/224 |

FOREIGN PATENT DOCUMENTS

| | | | | |
|---|---|---|---|---|
| DE | 102007047457 A1 | 4/2009 | | |
| DE | 102008026547 A1 | 12/2009 | | |
| DE | 102009009349 A1 | 8/2010 | | |
| EP | 0347859 A2 | 12/1989 | | |
| EP | 430260 A2 * | 6/1991 | | B60J 7/06 |
| JP | 61200027 A * | 9/1986 | | B60J 7/12 |
| JP | 02077325 A * | 3/1990 | | B60J 7/12 |

* cited by examiner

ADJUSTING DEVICE FOR A ROOF CAP OF A COLLAPSIBLE ROOF

CROSS-REFERENCE TO RELATED APPLICATIONS

This application claims foreign priority benefits under 35 U.S.C. §119(a)-(d) to DE 10 2010 056 246.7, filed Dec. 24, 2010, which is hereby incorporated by reference in its entirety.

TECHNICAL FIELD

The present invention relates to an adjusting device for a roof cap of a collapsible roof of a vehicle.

BACKGROUND

A type of a collapsible roof (i.e., a folding top) for a vehicle includes a top fabric and a roof cap. The front of the top fabric is wrapped around the roof cap and fixed on the underside of the roof cap. The rear of the top fabric is mounted to the rear of the vehicle body by a tensioning stay or a corner bow. The roof (including the top fabric with the roof cap) is movable between a closed position in which the top fabric covers a roof opening of the vehicle and an opened position in which the top fabric with the roof cap are moved rearward away from the roof opening to thereby expose the roof opening.

When the roof starts to open from the closed position to the opened position, the roof cap is lifted out of its forward position such that tension of the top fabric is released. Such tension of the top fabric secures and seals the closure of the roof opening. The roof cap is lifted so that stress on the seal in the contact region of the roof cap is kept as small as possible. During the roof opening process, the roof cap remains in a position slightly above the set position and is displaced into the rear region of the roof opening by lateral guides and guiding elements. The top fabric is thereby folded over cross bows of the roof such that in the opened position the top fabric is folded and stacked over itself in the rear region of the vehicle body with the roof cap placed on the folded top fabric.

The roof is fixed with respect to the vehicle body through a securing mechanism of the roof cap when the roof is in the opened position. The securing mechanism also fixes the roof cap in its forward position when the roof is in the closed position. In order to design the motions required for these purposes, an adjusting mechanism and guide elements of the roof are equipped with positive guides inside lateral guide rails. These mechanisms can be expensive and complicated depending on the predetermined motions and pivoting actions. As such, these mechanisms can have many components including components that frequently penetrate into and are lockable with one another. Many of the components are delicately designed and can easily be damaged under high load conditions. A danger is thus present that breakdown can occur during the complicated locking and actuation processes of such components. The components often transmit relatively large forces so they are manufactured from suitable materials. Such guiding and locking components are costly to manufacture due to the delicate design, expensive materials, and complicated mechanisms.

DE 10 2009 009 349 A1 describes a collapsible roof having a roof cap and a top fabric. The roof cap and the top fabric are pushed rearward when the roof is moved from the closed position towards the opened position. The roof cap first undergoes a vertical motion during the opening process. The slider has a slotted link in which a slider of a rod element is gripped and guided. The rod element is coupled with the rod-shaped support of the roof cap such that the slider is pushed towards the rear of the vehicle during the roof opening process. The roof cap is thereby moved and lifted by the slotted link. The slider has an unlocking contour on its lower side. The contour actuates a locking mechanism as a consequence of the displacement motion (after closing the roof cap). This retracts a locking bar from a locking aperture of the guide rail. Through this unlocking procedure, the guide element (a slider) is released in its direction of horizontal displacement so that the roof cap and the top fabric can be pushed into the rear of the roof opening.

DE 10 2007 047 457 B4 describes a roof having a roof part which can be displaced and pivoted by storage equipment on a guide of the roof. The roof is moved by a drive apparatus along the guide, which engages through a control apparatus that acts on a section of the path of motion of the roof part and controls the storage equipment. The roof part is pivoted into its angle of tilt relative to the guide. The control apparatus has a stop on the guide that coordinates the pivoting movement of the storage equipment. The roof part is mounted by two control arms on a slider that can be displaced along the guide tracks of guide rails. A hook-shaped locking element is in the front region of the slider with which the roof part can be fixed when the roof is in the closed position. The drive for displacing the roof part and the top fabric mounted thereon operates through a drive cable. The drive cable can be displaced in both the forward and rearward vehicle travel directions.

EP 0 347 859 B1 describes a roof having a roof cap and a top fabric. The roof cap has fasteners on its side ends on which two control arms are pivotably attached. The control arms are mounted on a displaceable slider. A control arm has a contact pin that penetrates into a slotted link of the guide rail. The control arm is forcibly guided by the contact pin and the slotted link according to the shape and path of the slotted link. Thereby, the roof cap may be lifted and maintain this position during the roof opening process. The slider can be displaced by a cable pull in either direction of vehicle travel. The slider is mounted with suitable cutouts in a guide rail. The guide of the slider passes parallel to the guide rail for controlling the roof cap. Locking in the opened position is carried out through the tension of the cable. No provision is made for an additional locking procedure using locking elements in either of the opened or closed positions. The locking of the roof cap is achieved by the forced guiding of the slotted link.

U.S. Pat. No. 5,746,475 describes a roof having movable flat roof parts. The roof parts are pivotable about a transverse axis located perpendicular to the longitudinal vehicle axis such that their respective ends can be lifted. Sliders can be displaced in side rails in the longitudinal vehicle direction. The rails are connected rigidly with the vehicle body in the region of the roof opening. They are guided and held in place according to the respective sliders by guide contours through supports of the sliders connected to the roof parts. The adjusting kinematics for adjusting the sliders are thereby achieved by the shape of the rails and the sliders that slide in them.

SUMMARY

An object of the present invention includes a collapsible roof (i.e., a folding top) for a vehicle in which the adjustment and locking of the roof in either the closed position or the opened position is accomplished in a cost effective manner by a simplified mechanism having a relatively small amount of components.

In carrying out at least one of the above and other objects, the present invention provides a collapsible roof for a vehicle.

The roof includes a roof guide extending along a side of a roof opening, a roof cap, a top fabric attached to the roof cap, and an adjusting mechanism. The adjusting mechanism movably couples the roof cap to the roof guide such that the roof cap with the top fabric is movable relative to the roof guide between a closed position in which the top fabric covers the roof opening and an opened position in which the top fabric with the roof cap are moved rearward away from the roof opening to thereby expose the roof opening. The adjusting mechanism includes front and rear control arms pivotably coupled to the roof cap. The front control arm includes a locking hook and the rear control arm includes a latching hook. The locking hook of the front control arm engages a front cavity of the roof guide in the closed position to fix the roof cap in place and the latching hook of the rear control arm engages a rear cavity of the roof guide in the opened position to fix the roof cap in place.

Further, in carrying out at least one of the above and other objects, the present invention provides a vehicle having a collapsible roof. The roof includes a roof guide extending along a side of a roof opening of the vehicle. The roof further includes a roof cap, a top fabric attached to the roof cap, and the adjusting mechanism described above.

Embodiments of the present invention are directed to a collapsible roof (i.e., a folding top) for a vehicle. The roof includes a top fabric and a roof cap. The front of the top fabric is attached to the roof cap. For example, the top fabric transitions into the roof cap in the forward direction of vehicle travel. The rear of the top fabric is mounted to the vehicle body, for example, by a tensioning stay or a corner bow. The roof (including the top fabric with the roof cap) is movable between a closed position in which the top fabric covers a roof opening of the vehicle and an opened position in which the top fabric with the roof cap are moved away from the roof opening to thereby expose the roof opening.

The roof further includes a roof guide having front and rear guide rails. The roof guide is on one side of the roof opening and another similar roof guide is on the other side of the roof opening. The front guide rail extends along the roof opening. The rear guide rail extends along a C-pillar of the vehicle. The rear of the front guide rail transitions into the front of the rear guide rail.

The roof further includes an adjusting device for the roof cap. The adjusting device includes front and rear control arms, a cam slider, and a guide element. The control arms are pivotably mounted at one end to the roof cap. The slider and the guide element are positioned within the guide rails. The slider with the guide element is movable along the guide rails inside of the guide rails. The front control arm includes a slotted opening. The slider includes a cam pin. The cam pin is engaged with the slotted opening such that the slider is movably coupled by the front control arm along the guide rails. The slider moves along a guide rail as the roof cap moves when the roof moves between the closed and opened positions.

Upon the roof moving from the closed position towards the opened position, the roof cap initially experiences a vertical movement after which the roof cap can be pushed rearward along the guide rails. In the closed position, the adjusting device locks the roof cap in its lowered, forward position to the front guide rail. In particular, a locking hook of the front control arm engages a cavity of the front guide rail. In the opened position, the adjusting device locks the roof cap in its rearward position on the folded fabric top to the rear guide rail.

The control arms form a four-bar kinematic linkage configured to move the roof cap into the vertically raised position upon the roof being moved from the closed position towards the opened position. The roof cap is lifted and displaced along the guide rails by the slider. For the vertical lifting of the roof cap, the locking hook of the front control arm is withdrawn from the cavity of the front guide rail.

The roof cap is rigid. For instance, the roof cap is made of sheet-metal or plastic. The roof cap is mounted at its side ends through pivot axes that can be moved on the control arms. The top fabric is attached to the roof cap in the front region of the top fabric so that in the closed position the tension of the top fabric for sealing the roof opening is achieved through the end position of the roof cap. In the closed position, the front region of the roof cap bears upon a seal that is positioned in the roof opening. The roof cap causes a slight deformation of the seal that is generally fabricated from elastic materials to achieve a tight seal. In order to prevent damage or severe wear of the seal, it is advantageous that the roof cap is lifted at the onset of the opening process of the roof. A simple displacement of the roof cap could damage or wear the seal.

In the closed position, the roof cap is to be fixed and locked. Typical locking mechanisms for this purpose are complicated and expensive. Locking bolts or special locking mechanisms are integrated as additional mechanical and structural parts in the roof guide region. In an embodiment of the present invention, the front control arm exhibits a locking hook. In the closed position, the locking hook engages an opening of the front guide rail to thereby fix the roof cap in position. This assures that the pressure force on the seal required in the closed position is achieved and that the tension for sealing is applied to the top fabric. In addition, an unintentional opening of the roof while driving is prevented in this manner.

In an embodiment of the present invention, the roof cap is pivotably mounted in its side end regions through the two control arms. Both control arms are pivotably attached to their ends that point away from the roof cap on the guide element. The control arms and the guide element can be fabricated from metal or plastic. The guide element is contained in the roof guide and the control arms are at least partially contained in the roof guide. The rear control arm has an end that extends beyond the pivot axis of the rear control arm on the guide element. In the opened position. The end is hook shaped. In the opened position, the hooked end of the rear control arm penetrates into a cavity in the rear guide rail such that the roof cap and the folded top fabric are fixed in position. The shape of the hook and the cavity are matched to one another so that the hook moves the rear control arm relatively with respect to the front control arm when the hook penetrates into the cavity such that the roof cap is pivoted by its front edge in the direction of forward vehicle travel. The roof stored in this manner can have individual folds and/or a Z-fold. The top fabric and roof cap are collected into a compact end position by the pivoting of the roof cap.

As described, in order to fix the roof cap in the closed and opened positions, the roof cap is locked respectively by a locking hook of the front control arm to a cavity of the front guide rail and by a hooked end of the rear control arm to a cavity of the rear guide rail. The movement of the roof cap takes place through the control arms, the cam slider, and the guide element. The control arms form a 4-bar linkage. The movement of the roof is produced through a slotted link formed in the front control arm by the cam slider. The cam slider has a cam (pin) that penetrates into the slotted link of the front control arm. The cam slider is moved by a tensioning cable in either the forward or rearward direction of vehicle motion. The tensioning cable can be a Bowden cable or a threaded cable.

The entire actuating mechanism and locking mechanism of the roof thus includes four components (the front and rear control arms, the cam slider, and the guide element). These components are at least partially contained inside the guide rails of the roof guide. These components can be positioned in the region of the roof guide to some extent both end-to-end and side-by-side. As such, a compact embodiment of this locking mechanism and actuating mechanism is achieved. Through this simple design for the locking and actuating mechanism, the front and rear guide rails of the roof guide can be designed simply in their respective shape and composition. The front guide rail is oriented along the roof opening in an essentially horizontal direction. The rear guide rail has a curved shape corresponding to the C-pillar of the vehicle.

The roof guide can be provided with a seal in the contact region with the top fabric. By the design of the shape, particularly of the guide element and the cam slider, the contact regions of these components with the roof guide can be kept relatively small so that only small frictional forces are anticipated during the movement and actuation. Cross bows oriented perpendicular to the longitudinal vehicle direction can be provided along the roof. The cross bows determine the fold pattern of the top fabric in the opened position and thus the shape of the storage compartment for the top fabric. The cross bows can be mounted and guided on additional guide elements in the roof guide and the guide elements and their neighboring guide elements used for initiating a movement can come into contact when the top fabric is opened and folded.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

Exemplary embodiments of the present invention are illustrated in the drawings and explained in greater detail in the following description. Identical, similar, or functionally equivalent components are denoted by the same reference numerals.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
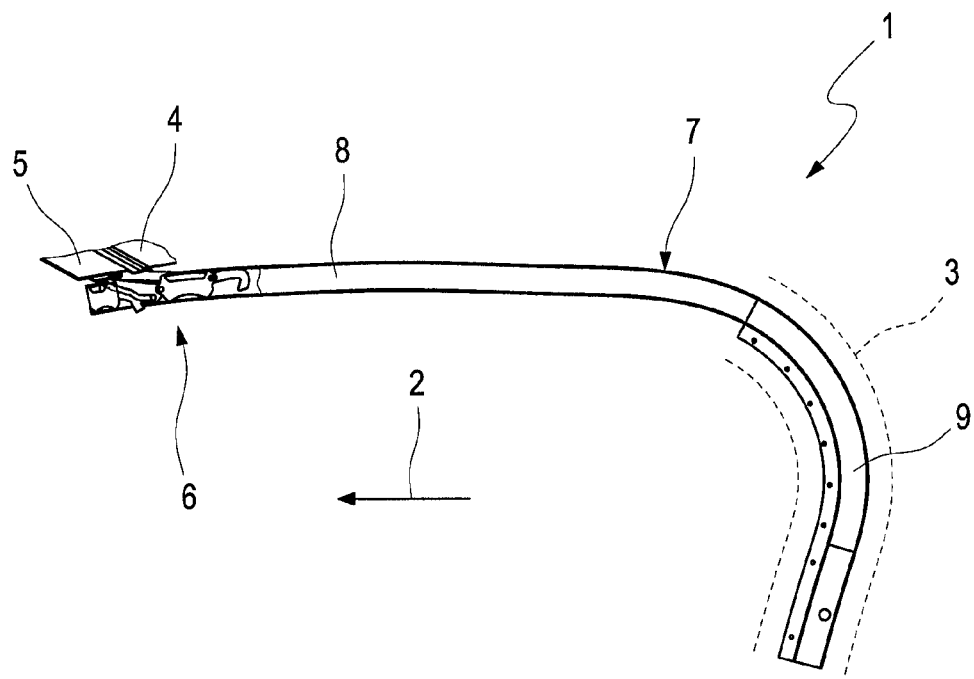
FIG. 1 illustrates a side view of a collapsible roof having a roof guide, a roof cap, a top fabric, and an adjusting mechanism for the roof cap in accordance with an embodiment of the present invention in which the roof is in a closed position.

Referring now to FIG. 1, a side view of a collapsible roof (i.e., a folding top) in accordance with an embodiment of the present invention in shown. The roof includes a roof guide 1, a roof cap 5, a top fabric 4, and an adjusting mechanism 6 for roof cap 5. The front of top fabric 4 is attached to roof cap 5. The rear of top fabric 4 is mounted to the vehicle body (not shown), for example, by a tensioning stay or a corner bow. The roof (including top fabric 4 with roof cap 5) is movable between a closed position in which top fabric 4 covers a roof opening of a vehicle and an opened position in which top fabric 4 with roof cap 5 are moved away from the roof opening to thereby expose the roof opening. In FIG. 1, the roof is in the closed position. In the closed position, top fabric 4 is stretched over the roof opening and roof cap 5 seals off the roof opening with its front end 46 such that a flush transition/path results between the roof, roof cap 5, and top fabric 4 in the transition region.

During the opening of the roof, roof cap 5 is moved rearward (i.e., opposite to the direction of forward vehicle motion 2) along roof guide 1. Roof guide 1 includes a pair of guide rails 7 which include a front guide rail 8 and a rear guide rail 9. Front guide rail 8 is oriented essentially horizontally. Front guide rail 8 is guided into rear guide rail 9 at its rear end pointing opposite to the direction of forward vehicle motion 2. Rear guide rail 9 is an extension of front guide rail 8. The free end of rear guide rail 9 points in the direction of the passenger compartment of the vehicle. Rear guide rail 9 is correspondingly matched to the shape of C-pillar 3 of the vehicle. As a result, only the bodywork and top fabric 4 can be seen in the closed position.

In order to open or close the roof, adjusting mechanism 6 is moved by a tensioning cable (Bowden cable or threaded cable) along guide rails 8, 9. The roof can assume an arbitrary number of intermediate positions in addition to the closed and opened positions. Guide rails 8, 9 are connected to the vehicle body in the opened region of the roof opening. Both the roof opening and regions of guide rails 8, 9 can be provided for mounting gaskets. Guide rails 8, 9 may be designed so that water penetrating into this region can be collected by a gutter and removed.

Figure 2:
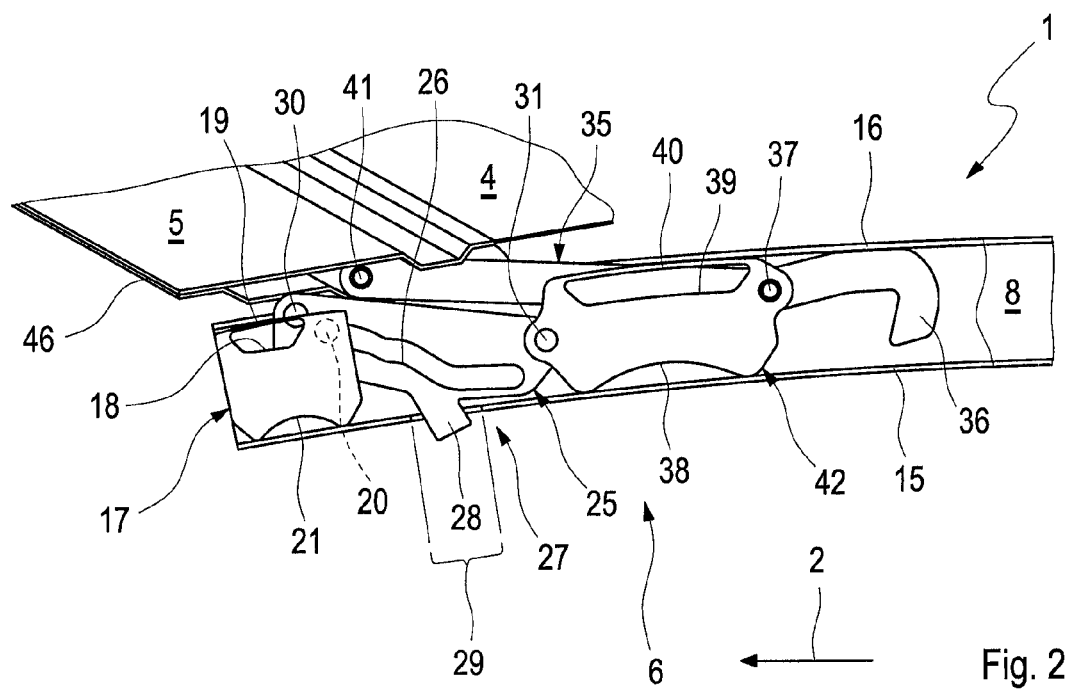
FIG. 2 illustrates a view of the roof in which the roof is in the closed position and the roof cap is locked by the adjusting mechanism in a lowered, forward position.

In order to open or close the roof, adjusting mechanism 6 is connected to roof cap 5. Adjusting mechanism 6 is shown in an enlarged view in FIG. 2 with the roof being in the closed position and roof cap 5 being locked in place. Roof cap 5 is locked in place to front guide rail 8. Front edge 46 of roof cap 5 bears on a pre-tensioned sealing gasket in the region of the roof opening (not shown). Top fabric 4 is tightened over the roof opening in this position.

Front guide rail 8, which follows the course of the roof opening, is limited by its end that is shown in the direction of vehicle travel 2 near front edge 46 of roof cap 5. Front and rear guide rails 8, 9 have profiles suitable for accommodating sliders and guide elements.

Adjusting mechanism 6 includes a front control arm 25, a rear control arm 35, a cam slider 17, and a guide element 42. Roof cap 5 is positioned or moved by control arms 25, 35. Control arms 25, 35 are mounted inside roof guide 1 on guide element 42 with pivot axes 31, 37. Control arms 25, 35 are pivotably connected to roof cap 5 with pivot axes 30, 41 in the side end region of roof cap 5.

Front control arm 25 is pivotably mounted with pivot axis 30 in the front third of roof cap 5. The end of front control arm 25 shown opposite to the direction of vehicle travel 2 is pivotably connected to guide element 42 with pivot axis 31. Front control arm 25 has a slotted link 26 lying approximately in its longitudinal dimension. Slotted link 26 is designed in its position and course of motion to correspond to the desired movements of roof cap 5. The lower region of front control arm 25 includes a locking hook 28. Locking hook 28 penetrates into a cavity 29 of front guide rail 8 when the roof is in the closed position in order to lock roof 5 in a lowered, forward position (shown in FIG. 2). The locking of roof 5 to front guide rail 8, and thus the fixing of the entire roof in the closed position, is designated by 27. The positioning of front control arm 25 in the closed position is caused by the constraint of the lower rear region of front control arm 25 between locking hook 28 and pivot axis 31 with lower boundary 15 of front guide rail 8.

The opening or closing movement of adjusting mechanism 6 is produced by cam slider 17. Cam slider 17 corresponds in its vertical dimension to the inner dimensions of roof guide 1. Cam slider 17 is connected to a suitable drive unit through a tensioning cable or threaded cable (not shown). Cam slider 17 is designed to reduce sliding friction with a cavity 21 in the region of lower boundary 15 of front guide rail 8 so that only the front or rear region of cam slider 17 is in contact with lower boundary 15 of front guide rail 8. On its upper boundary, cam slider 17 includes a cutout so that, due to cutout 18, the upper edge of cam slider 17 is designed as a thin bridge. This results in spring 19, which is in contact with upper boundary 16 of front guide rail 8 as a thin convex bridge. An underlying tension is produced by spring 19 between cam slider 17 and roof guide 1 so that cam slider 17 is permanently subjected to a uniform pressure force in roof guide 1.

The rear region of cam slider 17 includes a cam 20. Cam 20 is a pin or sliding element that penetrates into slotted link 26 of front control arm 25. When cam slider 17 is moved in the opposite direction to vehicle travel 2, front control arm 25 is pivoted upwardly about pivot axis 31 by the engagement of cam 20 in slotted link 26 so that roof cap 5 experiences a vertical upward rising motion as the initial motion. This motion is transmitted through roof cap 5 and pivot axis 41 on rear control arm 35 that then pivots vertically upward about pivot axis 37.

Shown in the direction opposite to vehicle travel 2, rear control arm 35 extends above pivot axis 37. The extension is shaped as a hook 36 at its end. The end of hook 36 is shaped like contact region 45. The extension of rear control arm 35 forms a stop between rear control arm 35 and upper boundary 16 of roof guide 1. During the opening of the roof, a further upward motion of roof cap 5 is prevented by the contact of contact region 45 of hook 46 at lower boundary 15 of front guide rail 8. When the roof is in the closed position, contact region 45 of hook 36 is separated from lower boundary 15.

Both control arms 25, 35 are separated from one another by pivot axes 31, 37 that are pivotably mounted on guide element 42. Analogous to cam slider 17, guide element 42 includes a cavity 38 in its lower region to reduce friction with lower boundary 15 of front guide rail 8. As such, a direct contact with front guide rail 8 occurs only in the front and rear end region of guide element 42. Guide element 42 is likewise provided with a cutout 39 on its end shown pointing upwards arranged near its upper edge. A thin, bridge-shaped connecting element remains in the direction of upper boundary 16 of front guide rail 8, which is designed as a spring 40. As with cam slider 17, spring 40 produces a permanent pressure force on upper boundary 16 of front guide rail 8 so that guide element 42 can also be held under pretension and displaced in guide rails 8, 9 during opening or closing movement of the roof.

Figure 3:
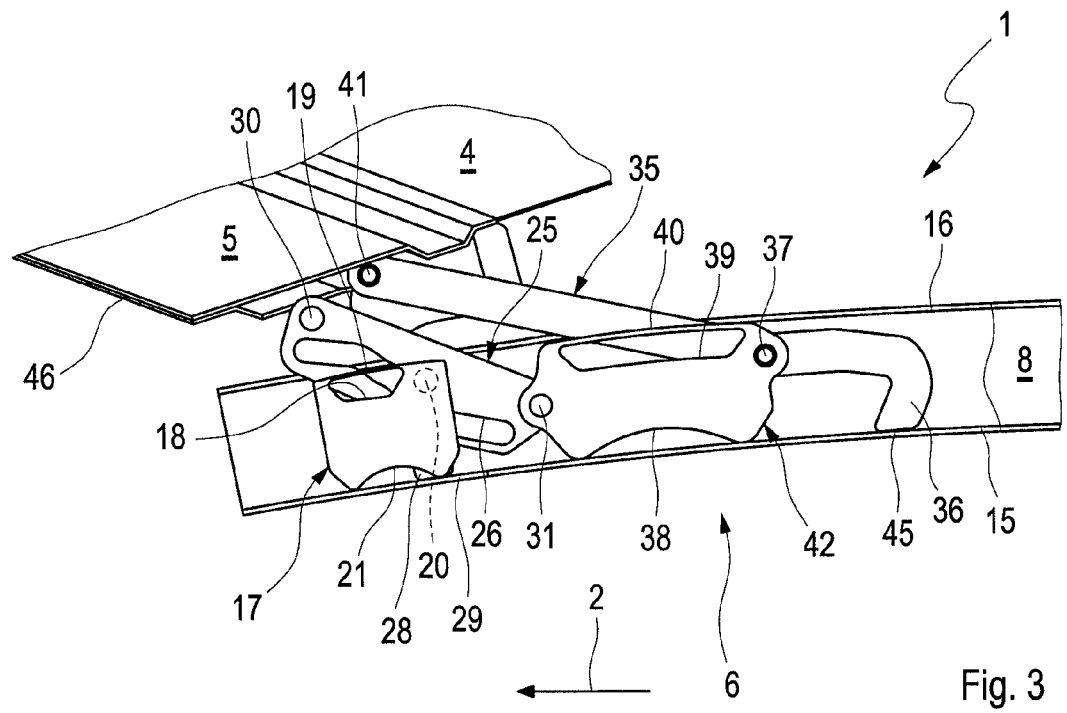
FIG. 3 illustrates a view of the roof in which the roof is beginning to be moved from the closed position towards an opened position and the roof cap is lifted by the adjusting mechanism out of its lowered, forward position.

In FIG. 3, the roof is beginning to be moved from the closed position towards an opened position and roof cap 5 is lifted by adjusting mechanism 6 out of its lowered, forward position. Cam slider 17 is moved in this manner in the direction opposite to vehicle travel 2 with cam 20 being moved in the slotted link 26 of front control arm 25 approximately in the middle position of slotted link 26. By this motion, front control arm 25 is pivoted vertically upwards and locking hook 28 of front control arm 25 is moved out of cavity 29 of front guide rail 8. The locking of roof cap 5 in the closed position is thereby released so that roof cap 5 and top fabric 4 can be displaced by a further movement that acts in the direction opposite to vehicle travel 2 in the direction of the rear of the vehicle.

The vertical pivoting of front control arm 25 is transmitted through pivot axes 30, 41 to rear control arm 35. Rear control arm 35 is pivoted vertically upwards approximately parallel to front control arm 25. The control arm that projects over pivot axis 37 thereby strikes in contact region 45 of hook 36 on lower boundary 15 of front guide rail 8. This boundary prevents further movement of roof cap 5 in the upward direction. In addition to the vertical lifting of roof cap 5 in the upward direction, front edge 46 of roof cap 5 points downwardly and thus roof cap 5 is brought into a forwardly tilted position through the four-bar linkage of control arms 25, 35. Because of this slanted orientation of roof cap 5, top fabric 4 connected to roof cap 5 is moved in a predetermined folded arrangement during a further movement to open the roof.

Figure 4:
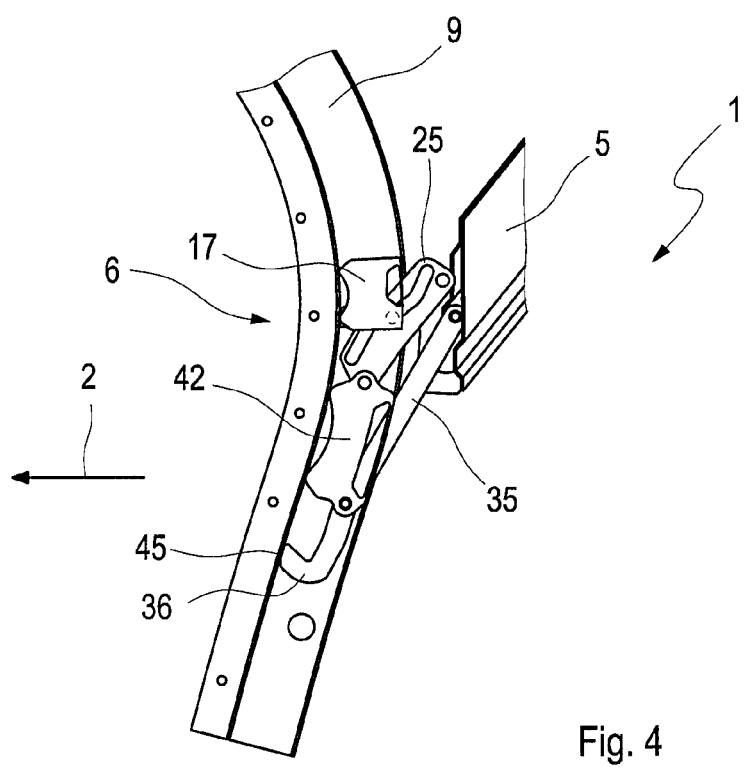
FIG. 4 illustrates a view of the roof in the region of a rear guide rail of the roof guide in which the roof is near the opened position.

In FIG. 4, the roof is near the opened position. As such, FIG. 4 illustrates adjusting mechanism 6 and roof cap 5 in the rear region of roof guide 1 (i.e., in the region of rear guide rail 9) shortly before the roof reaches the opened position. Adjusting mechanism 6 moves with roof cap 5 from its approximately horizontal orientation into a vertical position through the course of rear guide rail 9. The described dependencies and positions of the components of adjusting mechanism 6 remain unchanged as in FIG. 3. Hook 36 of rear control arm 35 rests in contact region 45 on lower boundary 15 of rear guide rail 9. As a result, analogous to FIG. 3, the instantaneous pivotability of roof cap 5 is restricted. Due to this contact of hook 36 with lower boundary 15 of rear guide rail 9, further pivoting is prevented, for example, when roof cap 5 is impacted by the dynamic wind pressure opposite the direction of travel 2. However, if roof cap 5 is impacted by a force (dynamic wind pressure) in the direction of vehicle motion 2, then hook 36 can be lifted out of its contact region 45 on lower boundary 15. In order to also limit movement of roof cap 5 in this situation, locking hook 28 bears on lower boundary 15 of guide rails 8, 9 in the form of a stop to thereby prevent movement of roof cap 5.

Figure 5:
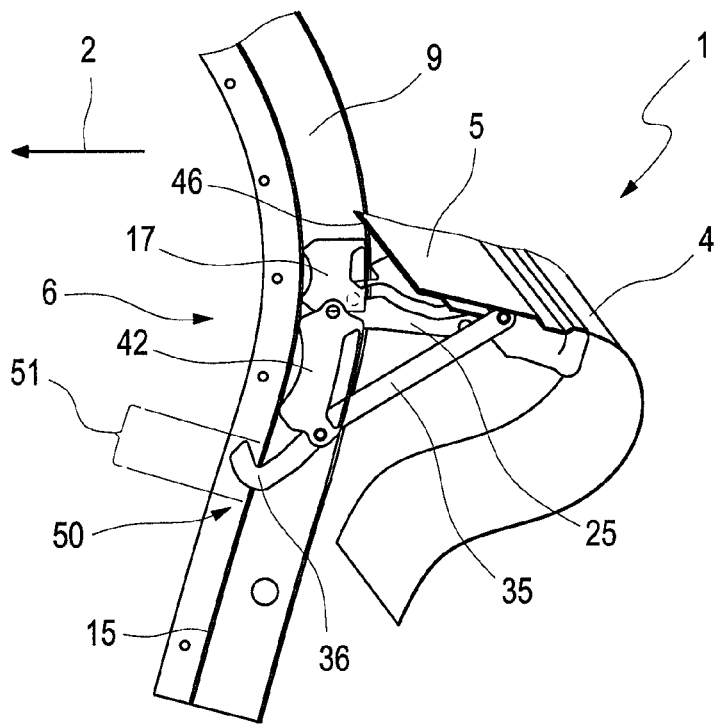
FIG. 5 illustrates a view of the roof in which the roof is in the opened position with the roof cap being fixed in a pivoted place by the adjusting mechanism.
Figure 6:
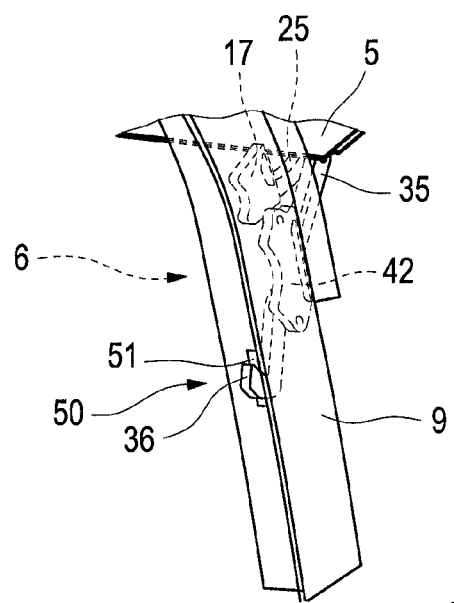
FIG. 6 illustrates a view of the rear guide rail with the latching hook of the rear control arm with the roof being in the opened position.

In FIGS. 5 and 6, the roof is in the opened position, designated by 50. When the opened position has been reached, latching hook 36 of the extension of rear control arm 35 engages in cavity 51 of lower boundary 15 of rear guide rail 9. Adjusting mechanism 6 is latched in the opened position by this penetration of latching hook 36 into cavity 51 of rear guide rail 9. Rear control arm 35 pivots as long as the rear region of rear control arm 35 with hook 36 is in contact with a boundary of cavity 51. A further possible restriction of this motion of roof cap 5 is achieved by front control arm 25 being pivoted in a nearly orthogonal position with respect to rear guide rail 9. This occurs when cam slider 17 is moved toward the point of contact with guide element 42. Front control arm 25 is pivoted by cam 20 and its engagement in slotted link 26. Additional pivoting of front control arm 25 or rear control arm 35 is no longer possible in this position since roof cap 5 movement is limited by the contact of cam slider 17 and by the contact of hook 36 in cavity region 51 of rear guide rail 9. Top fabric 4 is already multiply folded on top of itself in this situation. For example, a Z-fold of top fabric 4 is achieved. Due to the lever ratio of front control arm 25 to rear control arm 35 and pivot axes 31 and 37, roof cap 5 experiences a pivoting motion with front edge 46 of roof cap 5 being pivoted out of its vertical position upwardly nearly into a horizontal position as shown in the direction of vehicle travel 2.

As shown in FIG. 6, cam slider 17 is in the contact region with respect to guide element 42. Latching hook 36 concurrently extends through cavity 51 of rear guide rail 9. Fixing of the roof in the opened position is assured by this latching of hook 36 in cavity 51. Both locking hooks 36 and 28 can be secured by additional blocking mechanisms for both the opened and closed positions. Both cam slider 17 and guide element 42 can be locked by separate locking mechanisms through the side region of the front and rear guide rails 8, 9. In the position of roof cap 5 shown in FIG. 5, front control arm 25 nearly forms an angle of 45° with respect to rear control arm 35. Its dimensions and positioning depends on the lever ratios between pivot axes 30 to 31 and 41 to 37. It is also possible to adapt the end position of roof cap 5 accordingly.

Control arms 25, 35 and cam slider 17 and guide element 42 can be fabricated from metal and plastic. A selection from plastic materials having reduced sliding friction inside roof guide 1 is advantageous for cam slider 17 and guide element 42.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:
1. A collapsible roof for a vehicle comprising:
a roof guide extending along a side of a roof opening;
a roof cap;
a top fabric attached to the roof cap;
an adjusting mechanism movably coupling the roof cap to the roof guide such that the roof cap with the top fabric is movable relative to the roof guide between a closed position in which the top fabric covers the roof opening and an opened position in which the top fabric with the roof cap are moved rearward away from the roof opening to thereby expose the roof opening;
wherein the adjusting mechanism includes front and rear control arms pivotably coupled to the roof cap, wherein the front control arm includes a locking hook and the rear control arm includes a latching hook, wherein the locking hook of the front control arm engages a front cavity of the roof guide in the closed position to fix the roof cap in place and the latching hook of the rear control arm engages a rear cavity of the roof guide in the opened position to fix the roof cap in place.

2. The roof of claim 1 wherein:
the roof guide includes a front guide rail and a rear guide rail, wherein the front guide rail includes the front cavity and the rear guide rail includes the rear cavity.

3. The roof of claim 2 wherein:
during movement of the roof cap with the top fabric between the closed and opened positions, the locking hook of the front control arm slides along the lower boundary of the guide rails.

4. The roof of claim 2 wherein:
the adjusting mechanism further includes a guide element movable along the guide rails, wherein the control arms are pivotably connected to the guide element such that the control arms form a four-bar kinematic linkage for moving the roof cap with the top fabric.

5. The roof of claim 4 wherein:
the rear control arm includes an extension beyond its pivot axis on the guide element and the extension includes the latching hook of the rear control arm.

6. The roof of claim 5 wherein:
the latching hook of the rear control arm slides along the lower boundary of the guide rails as the roof cap with the top fabric are moved between the closed and opened positions.

7. The roof of claim 4 wherein:
the adjusting mechanism further includes a cam slider movable along the guide rails, wherein the cam slider includes a cam and the front control arm includes a slotted link, wherein the cam engages the slotted link such that motion of the roof cap corresponds to movement of the cam along the slotted link as the roof cap with the top fabric move between the closed and open positions.

8. The roof of claim 4 wherein:
the cam slider and the slotted link of the front control arm are configured such that the front edge of the roof cap is oriented in the direction of forward vehicle travel in the opened position.

9. The roof of claim 4 wherein:
after the roof cap has been vertically lifted as a result of movement of the cam of the cam slider along the slotted link of the front control arm during movement of the roof cap with the top fabric towards the opened position, further movement of the cam along the slotted link is prevented by contact of the latching hook of the rear control arm with the lower boundary of the guide rails as the roof cap with the top fabric is moved further towards the opened position.

10. The roof of claim 4 wherein:
in the opened position, the control arms form an angle of about 45 degrees with respect to one another and the cam slider is positioned below the front control arm and adjacent to the guide element.

11. The roof of claim 4 wherein:
the cam slider is forced loaded to prevent an independent movement of the roof cap.

12. The roof of claim 4 wherein:
the cam slider and the slotted link of the front control arm are configured such that the front control arm is lifted vertically to thereby vertically lift the roof cap when the roof cap with the top fabric are moved from the closed position towards the opened position.

13. The roof of claim 12 wherein:
the vertical lifting of the front control arm causes the locking hook of the front control arm to disengage from the cavity of the front guide rail to thereby enable the roof cap with the top fabric to be moved from the closed position towards the opened position.

14. A vehicle comprising:
a vehicle body having a roof opening;
a collapsible roof having a roof guide extending along a side of the roof opening, a roof cap, a top fabric attached to the roof cap, and an adjusting mechanism movably coupling the roof cap to the roof guide such that the roof cap with the top fabric is movable relative to the roof guide between a closed position in which the top fabric covers the roof opening and an opened position in which the top fabric with the roof cap are moved rearward away from the roof opening to thereby expose the roof opening;
wherein the adjusting mechanism includes front and rear control arms pivotably coupled to the roof cap, wherein the front control arm includes a locking hook and the rear control arm includes a latching hook, wherein the locking hook of the front control arm engages a front cavity of the roof guide in the closed position to fix the roof cap in place and the latching hook of the rear control arm engages a rear cavity of the roof guide in the opened position to fix the roof cap in place.

15. The vehicle of claim 14 wherein:
the locking hook of the front control arm and the latching hook of the rear control arm slide along the lower boundary of the guide rail as the roof cap with the top fabric are moved between the closed and opened positions.

16. The vehicle of claim 14 wherein
the roof guide includes a front guide rail and a rear guide rail, wherein the front guide rail includes the front cavity and the rear guide rail includes the rear cavity;
wherein the adjusting mechanism further includes a guide element movable along the guide rails, wherein the control arms are pivotably connected to the guide element such that the control arms form a four-bar kinematic linkage for moving the roof cap with the top fabric.

17. The vehicle of claim 16 wherein:
the adjusting mechanism further includes a cam slider movable along the guide rails, wherein the cam slider includes a cam and the front control arm includes a slotted link, wherein the cam engages the slotted link such that motion of the roof cap corresponds to movement of the cam along the slotted link as the roof cap with the top fabric move between the closed and open positions.

18. The vehicle of claim 17 wherein:
the cam slider and the slotted link of the front control arm are configured such that the front control arm is lifted vertically to thereby vertically lift the roof cap when the roof cap with the top fabric are moved from the closed position towards the opened position;
wherein the vertical lifting of the front control arm causes the locking hook of the front control arm to disengage from the cavity of the front guide rail to thereby enable the roof cap with the top fabric to be moved from the closed position towards the opened position.

19. The vehicle of claim 17 wherein:
the cam slider and the slotted link of the front control arm are configured such that the front edge of the roof cap is oriented in the direction of forward vehicle travel in the opened position.

20. The vehicle of claim 17 wherein:
after the roof cap has been vertically lifted as a result of movement of the cam of the cam slider along the slotted link of the front control arm during movement of the roof cap with the top fabric towards the opened position, further movement of the cam along the slotted link is prevented by contact of the latching hook of the rear control arm with the lower boundary of the guide rails as the roof cap with the top fabric is moved further towards the opened position.

\* \* \* \* \*

UNITED STATES PATENT AND TRADEMARK OFFICE
CERTIFICATE OF CORRECTION

PATENT NO. : 8,657,360 B2  Page 1 of 1
APPLICATION NO. : 13/333298
DATED : February 25, 2014
INVENTOR(S) : Katrini et al.

It is certified that error appears in the above-identified patent and that said Letters Patent is hereby corrected as shown below:

In the Claims

Column 10, Line 35, Claim 8:

After "The roof of claim"
Delete "4" and insert -- 7 --.

Column 10, Line 40, Claim 9:

After "The roof of claim"
Delete "4" and insert -- 7 --.

Column 10, Line 50, Claim 10:

After "The roof of claim"
Delete "4" and insert -- 7 --.

Column 11, Line 55, Claim 11:

After "The roof of claim"
Delete "4" and insert -- 7 --.

Signed and Sealed this
Twenty-fourth Day of June, 2014

Michelle K. Lee
*Deputy Director of the United States Patent and Trademark Office*